United States Patent
Kira et al.

(10) Patent No.: US 7,240,748 B2
(45) Date of Patent: Jul. 10, 2007

(54) HYBRID VEHICLE

(75) Inventors: Nobuhiro Kira, Saitama (JP); Tetsuya Hasebe, Saitama (JP); Ryo Nishikawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 296 days.

(21) Appl. No.: 10/663,764

(22) Filed: Sep. 17, 2003

(65) Prior Publication Data
US 2004/0069548 A1 Apr. 15, 2004

(30) Foreign Application Priority Data
Sep. 20, 2002 (JP) ............ P.2002-274315

(51) Int. Cl.
*B60K 1/00* (2006.01)
(52) U.S. Cl. ............ 180/65.2; 180/65.6; 180/65.5; 903/906
(58) Field of Classification Search ............ 180/65.1, 180/65.2, 65.3, 65.4, 65.5, 65.6, 243, 312; 701/112, 22; 475/4, 5, 6; 74/665 A
See application file for complete search history.

(56) References Cited

U.S. PATENT DOCUMENTS

| | | | |
|---|---|---|---|
| 2,581,596 A * | 1/1952 | Nims ............ | 180/65.4 |
| 3,575,621 A * | 4/1971 | Voland et al. ............ | 310/112 |
| 4,090,577 A | 5/1978 | Moore | |
| 4,351,405 A * | 9/1982 | Fields et al. ............ | 180/65.2 |
| 4,579,019 A * | 4/1986 | Gabriele ............ | 475/5 |
| 5,085,071 A * | 2/1992 | Mizushina et al. ........ | 73/118.1 |
| 5,142,903 A * | 9/1992 | Mizushina et al. ........ | 73/118.1 |
| 5,176,213 A * | 1/1993 | Kawai et al. ............ | 180/243 |
| 5,253,724 A | 10/1993 | Prior | |
| 5,289,890 A * | 3/1994 | Toyoda et al. ............ | 180/65.8 |
| 5,327,987 A * | 7/1994 | Abdelmalek ............ | 180/65.2 |
| 5,627,438 A | 5/1997 | Barrett | |
| 5,643,120 A * | 7/1997 | Murashima et al. ............ | 475/5 |
| 5,934,397 A | 8/1999 | Schaper | |
| 6,009,371 A * | 12/1999 | Kobayashi ............ | 701/112 |
| 6,059,064 A * | 5/2000 | Nagano et al. ............ | 180/243 |
| 6,205,379 B1 * | 3/2001 | Morisawa et al. ............ | 701/22 |
| 6,295,487 B1 * | 9/2001 | Ono et al. ............ | 701/22 |
| 6,314,347 B1 * | 11/2001 | Kuroda et al. ............ | 701/22 |
| 6,349,782 B1 * | 2/2002 | Sekiya et al. ............ | 180/65.2 |
| 6,387,007 B1 * | 5/2002 | Fini, Jr. ............ | 475/5 |
| 6,394,210 B2 * | 5/2002 | Matsuda et al. ............ | 180/68.1 |
| 6,419,040 B2 * | 7/2002 | Kitano et al. ............ | 180/243 |
| 6,435,296 B1 * | 8/2002 | Arai ............ | 180/243 |

(Continued)

FOREIGN PATENT DOCUMENTS

DE 333377 10/1919

(Continued)

*Primary Examiner*—Hau Phan
(74) *Attorney, Agent, or Firm*—Arent Fox LLP

(57) ABSTRACT

In a hybrid vehicle in which front wheels are driven by an engine and a front motor, and rear wheels are driven by a main rear motor and a sub rear motor, both main rear motor and the sub rear motor are driven when a large driving force is required as when the vehicle is driven at low speed to haul a trailer or the like or to run on a sandy ground, whereas when the required driving force is small, only the main rear motor is driven.

12 Claims, 8 Drawing Sheets

U.S. PATENT DOCUMENTS

| | | | |
|---|---|---|---|
| 6,549,840 B1 * | 4/2003 | Mikami et al. | 180/65.2 |
| 6,569,055 B2 * | 5/2003 | Urasawa et al. | 180/65.2 |
| 6,579,201 B2 * | 6/2003 | Bowen | 475/5 |
| 6,617,704 B2 * | 9/2003 | Tomikawa | 180/65.2 |
| 6,685,591 B2 * | 2/2004 | Hanyu et al. | 475/5 |
| 6,895,835 B2 * | 5/2005 | Cordeiro | 74/665 A |
| 2001/0039230 A1 | 11/2001 | Severinsky et al. | |
| 2002/0023790 A1 | 2/2002 | Hata et al. | |
| 2004/0176203 A1 * | 9/2004 | Supina et al. | 475/8 |

FOREIGN PATENT DOCUMENTS

| | | |
|---|---|---|
| EP | 0 622 264 A2 | 11/1994 |
| JP | 54-162329 | 12/1979 |
| JP | 4-183206 | 6/1992 |
| JP | 11-208304 | 8/1999 |

\* cited by examiner

HYBRID VEHICLE

BACKGROUND OF THE INVENTION

1. Field of the Invention

The present invention relates to a hybrid vehicle in which main driving wheels are driven by an engine and sub driving wheels are driven by a motor.

2. Description of the Related Art

A hybrid vehicle is described in JP-A-11-208304 in which main driving wheels are driven by an engine and/or a first motor and sub driving wheels are driven by a second motor. In the hybrid vehicle, a mode in which the vehicle is driven only by the motor and a mode in which the vehicle is driven by both the engine and the motor are combined in order to reduce its fuel consumption.

Incidentally, as is often the case with this kind of hybrid vehicle when attempting to impart the vehicle a running through performance that is to be provided by a four-wheel drive vehicle, the driving force of the rear wheels becomes insufficient. To be specific, this unfavorable fact becomes conspicuous ① when the vehicle runs on a gravelly road at low speed (in the order of 30 km/h) and ② when the vehicle climbs up an uphill road near a lakeside while hauling a boat.

In order to make the running under ① possible, the output of the motor for the rear wheels needs to be increased, and in order to make the running under ② possible, the torque of the motor for the rear wheels needs to be increased. In either of the cases, it is unavoidable that the size of the motor is enlarged. However, in case the motor is enlarged, there are caused some problems such as that the minimum ground clearance is reduced, an intersecting angle with the drive shafts is increased, and lowering the floor level of the vehicle becomes difficult.

SUMMARY OF THE INVENTION

The invention was made in view of these situations and an object thereof is to enable an increase in driving force of the sub driving wheels of the hybrid vehicle while suppressing to a minimum level the increase in size of the motor for driving the sub driving wheels.

With a view to attaining the object, according to a first aspect of the invention, there is proposed a hybrid vehicle comprising an engine for driving main driving wheels and a plurality of motors for driving sub driving wheels, wherein at least one motor is selected from the plurality of motors to drive the sub driving wheels according to a driving force required by the vehicle.

According to the construction, the motor for driving the sub driving wheels comprises the plurality of different motors, so that at least one motor or all the motors can be used to drive the sub driving wheels according to a driving force required by the vehicle. Therefore, when compared with a case where a single motor is provided which can supply the total of driving forces of the plurality of motors, the sizes of the individual motors can be made smaller. Due to this, the minimum ground clearance of the vehicle can be reduced, the intersecting angle with the drive shafts can be decreased, and the floor level of the vehicle can be lowered while enhancing the running through performance when the required driving force of the vehicle is large.

In addition, according to a second aspect of the invention, there is proposed a hybrid vehicle as set forth in the first aspect of the invention, wherein the sub driving wheels are driven by all the motors at low vehicle speed where the driving force required by the vehicle is large.

According to the construction, the running through performance can be enhanced sufficiently by driving the sub driving wheels by all the motors as when running while hauling the boat or the like or on the gravelly road at low speed where a large driving force is required.

Additionally, according to a third aspect of the invention, there is proposed a hybrid vehicle as set forth in the first aspect of the invention, wherein the plurality of motors comprises a main motor having a large output and a sub motor having a small output, the sub motor being disposed on an upstream side of the main motor relative to a direction in which the driving force is transmitted to the sub driving wheels.

According to the construction, since the sub motor having a small output is disposed on the upstream side of the main motor relative to the direction in which the driving force is transmitted to the sub driving wheels, when the sub motor is brought to a stop since the required driving force can be supplied only by the main motor, there is caused no risk that the sub motor, which is being so stopped, resides along the power transmission path of the main motor to interrupt the transmission of power therefrom.

In addition, according to a fourth aspect of the invention, there is proposed a hybrid vehicle as set forth in the third aspect of the invention, wherein a clutch for interrupting the transmission of driving force is disposed between the sub motor and the main motor.

According to the construction, since the clutch for interrupting the transmission of driving force is interposed between the sub motor and the main motor, when driving the main motor with the sub motor being brought to a stop, the sub motor is prevented from being drawn by the main motor to thereby prevent an increase in power consumption.

Additionally, according to a fifth aspect of the invention, there is proposed a hybrid vehicle as set forth in the first aspect of the invention, wherein the plurality of motors comprises a main motor having a large output and a sub motor having a small output, and wherein a high-voltage battery for driving the main motor is charged with regenerative power of the main motor, whereas a low-voltage battery for driving the sub motor is charged by a generator driven by the engine.

According to the construction, since the high-voltage battery for driving the main motor having a large output is charged with regenerative power of the main motor, whereas the low-voltage battery for driving the sub motor having a small output is charged by the generator driven by the engine, the low-voltage battery is caused to bear part of the power for driving the sub driving wheels, so that the capacity of the high-voltage battery consuming more power can be reduced. Moreover, since the sub motor is driven after generated output of the generator is once stored in the low-voltage battery, when compared with a case where the sub motor is direct driven by the generated output of the generator, the control of the generator can be simplified.

In addition, according to a sixth aspect of the invention, there is provided a hybrid vehicle as set forth in the first aspect of the invention, wherein the plurality of motors comprises a main motor having a large output and a sub motor having a small output, and wherein a battery for driving the main motor is charged with regenerative power of the main motor, and the sub motor is driven by generated output of a generator driven by the engine.

According to the construction, since the high-voltage battery for driving the main motor having a large output is charged with regenerative power of the main motor and the sub motor having a small output is driven by the generated output of the generator driven by the engine, the generated output of the generator is supplied for use for part of the power for driving the sub driving wheels, so that the capacity of the high-voltage battery consuming more power can be reduced. Moreover, no battery for storing the generated output of the generator is required, this contributing to the reduction in cost and space.

Additionally, according to a seventh aspect of the invention, there is provided a hybrid vehicle as set forth in the first aspect of the invention, wherein the plurality of motors comprises a main motor having a large output and a sub motor having a small output, and wherein a battery for driving the main motor is charged with regenerative power of the main motor, and the sub motor is driven by lowering the voltage of the battery by a downverter.

According to the construction, since the high-voltage battery for driving the main motor having a large output is charged with regenerative power of the main motor and the sub motor having a small output is driven by lowering the voltage of the battery by a downverter, neither a generator nor a battery exclusively used for driving the sub driving wheel is required, which can contribute to the reduction in cost and space.

Additionally, according to an eights aspect of the invention, there is proposed a hybrid vehicle as set forth in the third aspect of the invention, wherein a speed reduction member is disposed between the sub motor and the main motor.

According to the construction, since the torque of the sub motor can be amplified by the speed reduction member, the sub motor can be made smaller in size, and moreover, the torque of the sub motor can be amplified further along a reduction path of the main motor.

In addition, according to a ninth aspect of the invention, there is proposed a hybrid vehicle as set forth in the first aspect of the invention, further comprising a motor/generator which functions both as a motor to assist the engine for driving the main driving wheels in providing driving force and as a generator to generate power by being driven by driving force of the engine or driving force which is reversely transmitted from the main driving wheels.

According to the construction, by provision of the motor/generator which functions as a motor to assist the engine in providing driving force, in the event that a required driving force is not sufficiently supplied only by the engine for driving the main driving wheels and the motor for driving the sub driving wheels, the driving force of the motor/generator can assist in sufficing the required driving force. In addition, by provision of the motor/generator which functions as a generator to generate power, in the event that only the generative power generated by the motor using the driving force reversely transmitted from the sub driving wheels is insufficient for a requirement, the motor/generator can be made to function as the generator by the driving force of the engine or driving force reversely transmitted from the main driving wheels so as to increase the power generating capability of the vehicle.

Note that a high-voltage battery Bh in an embodiment of the invention corresponds to the battery of the invention, an electromagnetic clutch C2 in the embodiment corresponds to the clutch of the invention, a front motor M in the embodiment corresponds to the motor/generator of the invention, a sub rear motor Ms in the embodiment corresponds to the sub motor or the motor of the invention, front wheels Wf in the embodiment correspond to the main driving wheels of the invention, rear wheels Wr in the embodiment correspond to the sub driving wheels of the invention, and a first gear 13 and a second gear 15 in the embodiment correspond to the speed reduction member of the invention.

DETAILED DESCRIPTION OF THE INVENTION

A mode for carrying out the invention will be described below based on embodiments of the invention illustrated in the accompanying drawings.

Figure 1:
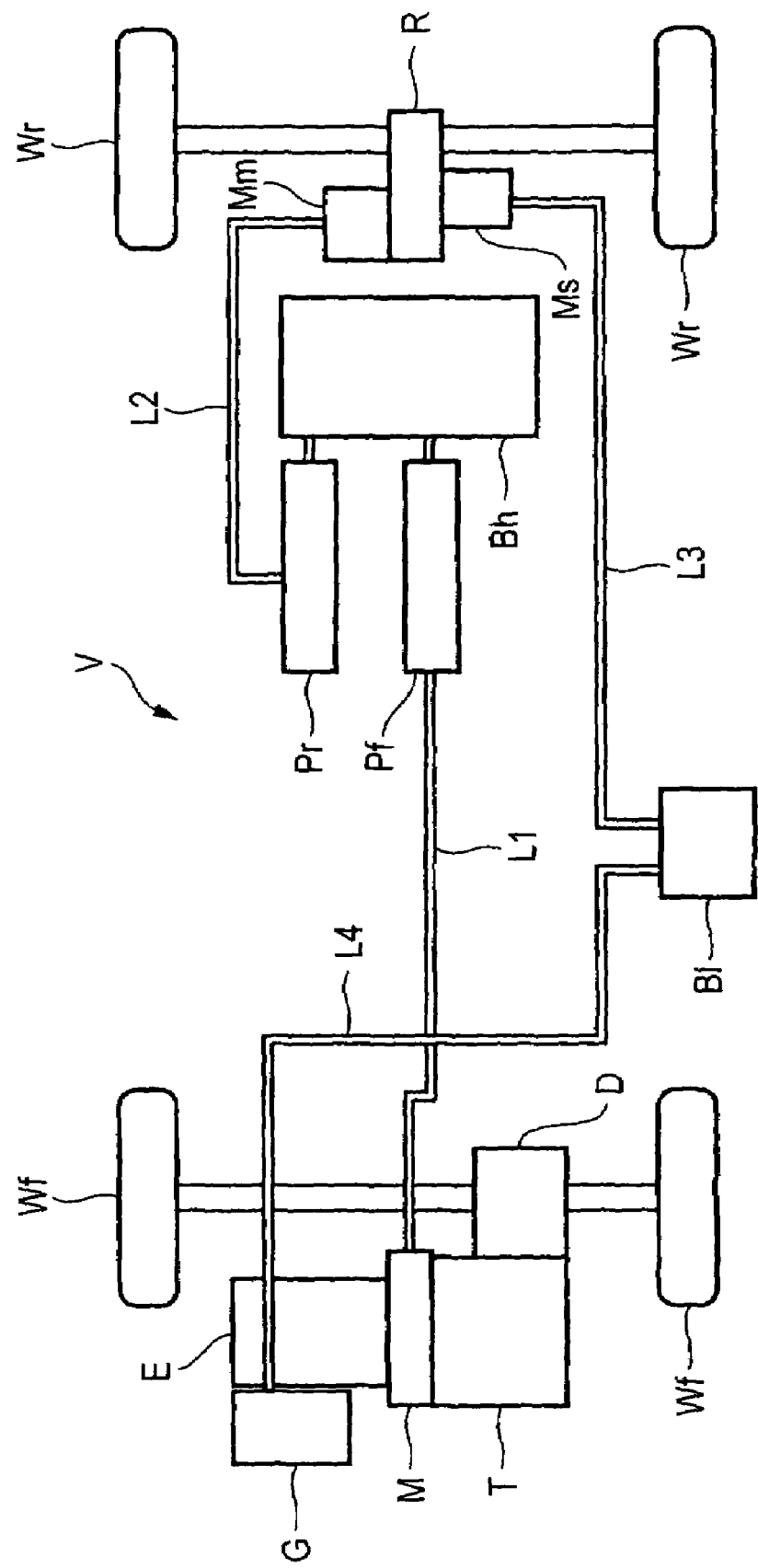
FIG. 1 is a diagram showing an overall configuration of a hybrid vehicle according to a first embodiment.
Figure 2:
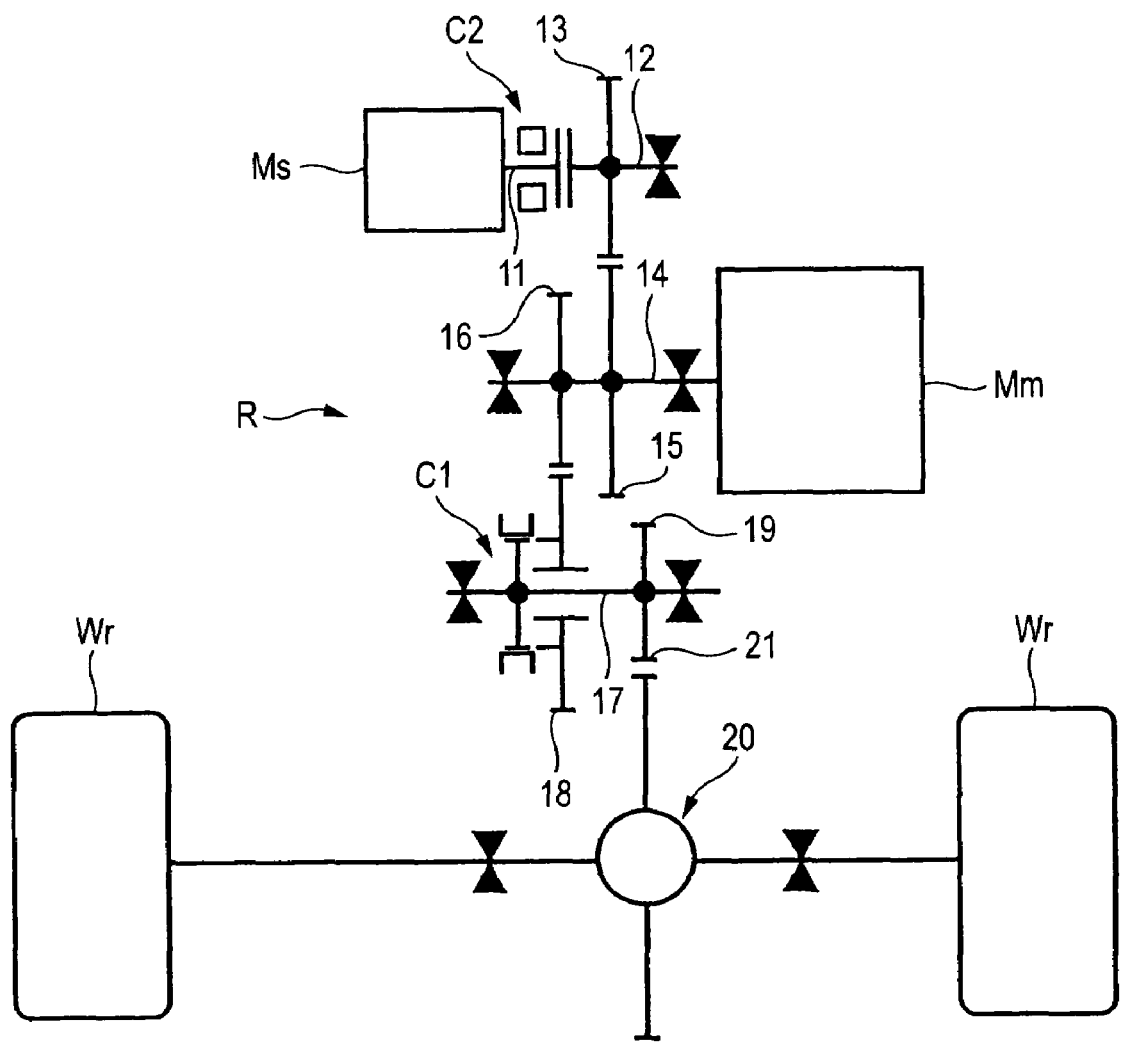
FIG. 2 is a diagram showing the construction of a driving system for rear wheels.
Figure 3:
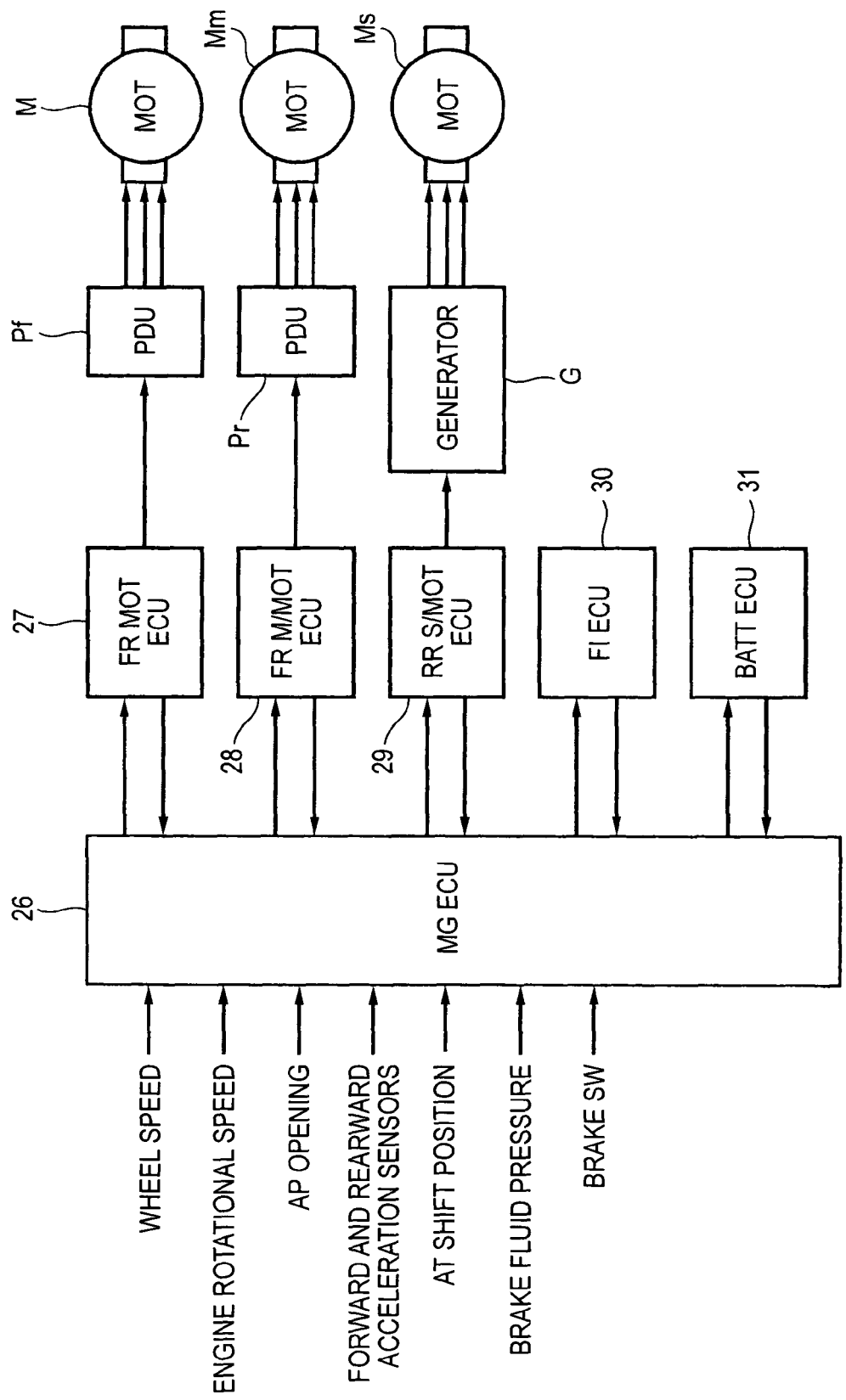
FIG. 3 is a diagram showing a control system of motors.
Figure 4:
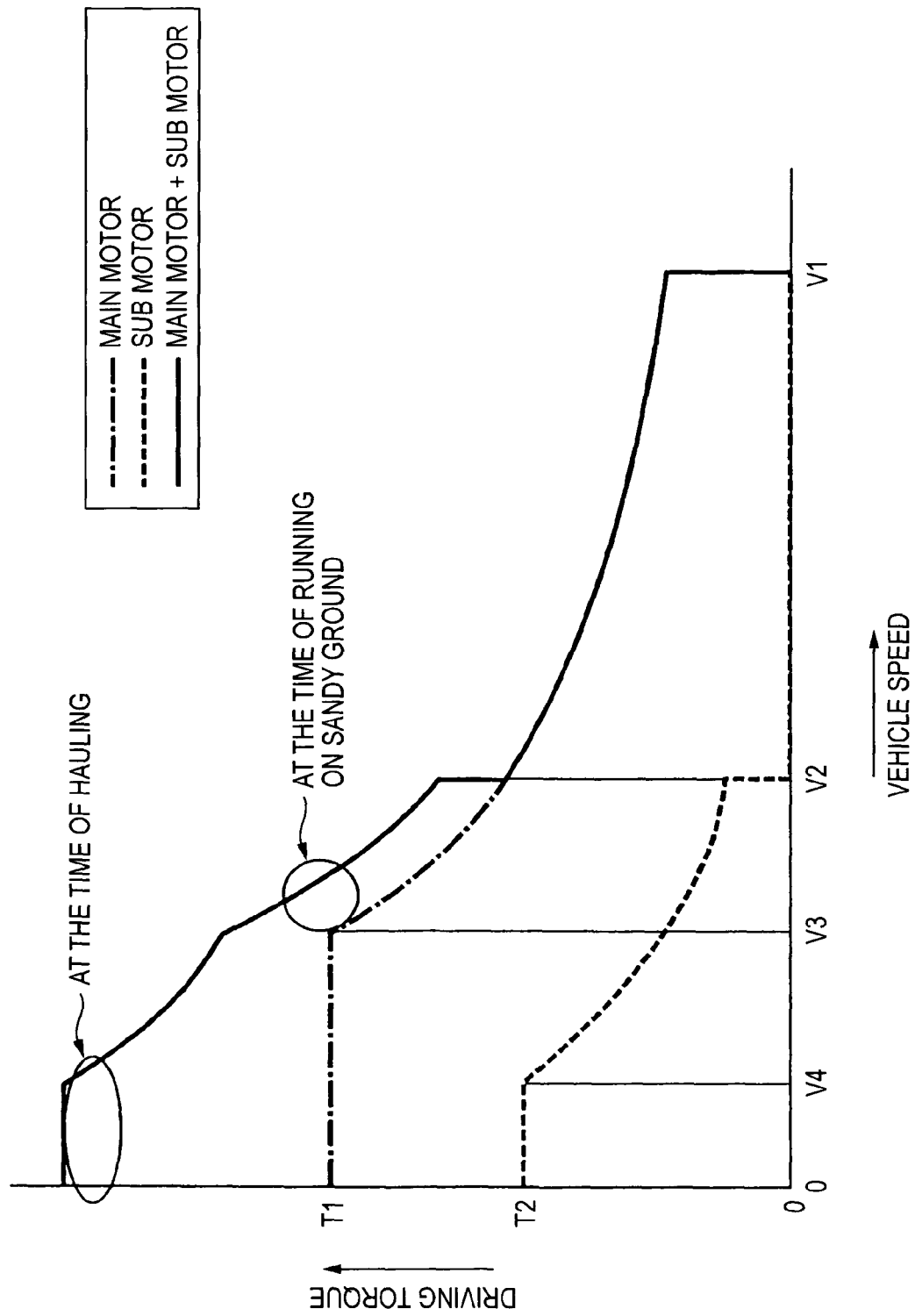
FIG. 4 is a graph showing changes in driving torques of main and sub rear motors relative to the vehicle speed.
Figure 5:
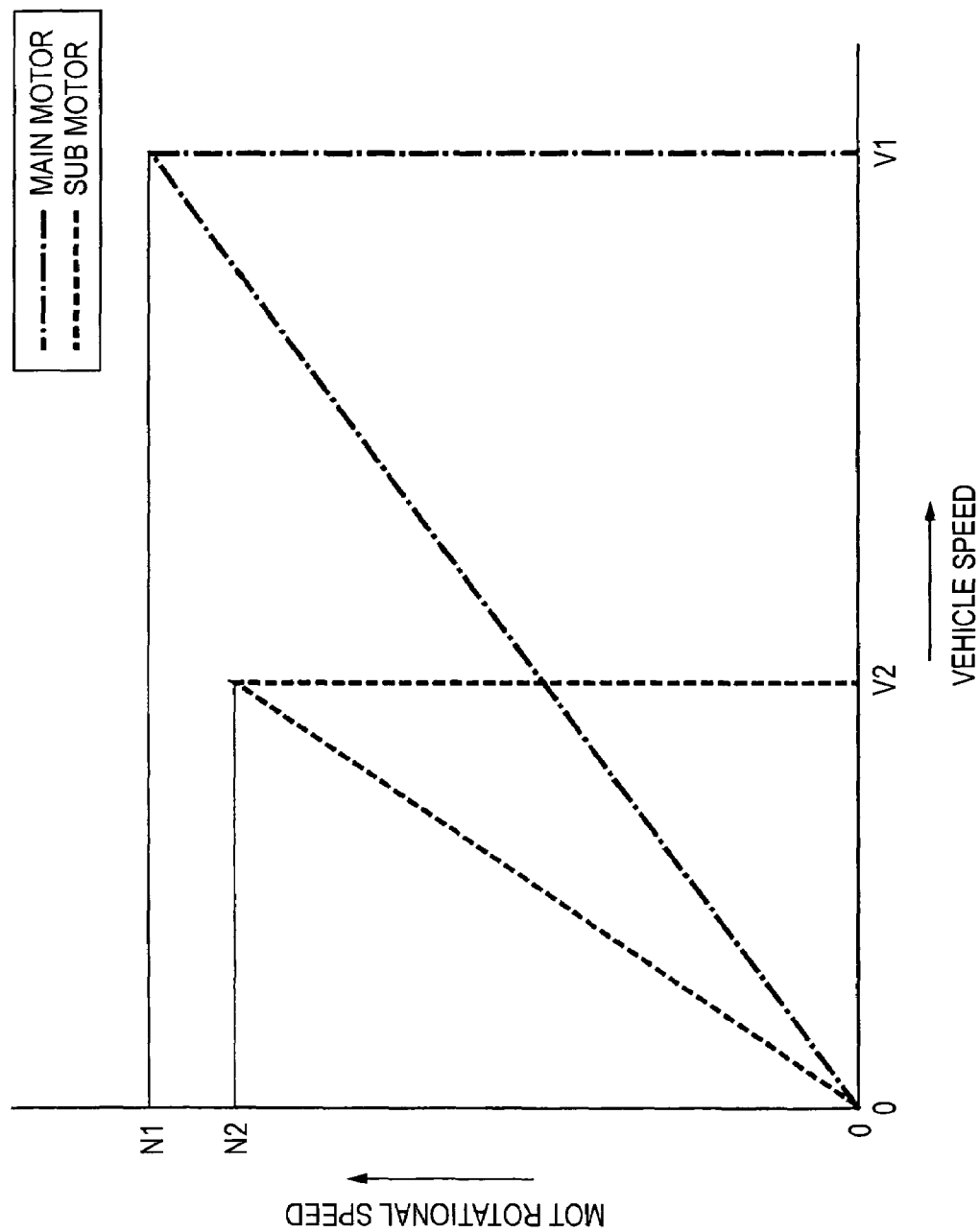
FIG. 5 is a graph showing changes in rotational speeds of the main and sub rear motors relative to the vehicle speed.

FIGS. 1 to 5 show a first embodiment of the invention. FIG. 1 is a diagram showing an overall configuration of a hybrid vehicle. FIG. 2 is a diagram showing the construction of a driving system for rear wheels. FIG. 3 is a diagram showing a control system of motors. FIG. 4 is a graph showing changes in driving torques of main and sub rear motors relative to the vehicle speed. FIG. 5 is a graph showing changes in rotational speeds of the main and sub rear motors relative to the vehicle speed.

As shown in FIG. 1, a hybrid vehicle V has left and right front wheels Wf, Wf which are main driving wheels and left and right rear wheels Wr, Wr which are sub driving wheels. Among an engine E for driving the front wheels Wf, Wf, a transmission T and a differential D, a front motor M constituted by a three-phase alternating-current motor is interposed in line between the engine E and the transmission T. By driving the front motor M, the engine E is assisted in providing driving force, and by making the front motor M function as a generator, power can be generated. A main rear motor Mm made up of a three-phase alternating-current motor having a large output and a sub rear motor Ms made up of a direct-current brush motor having a small output are connected to the rear wheels Wr, Wr via a speed reduction gear set R.

The front motor M for driving the front wheels Wf, Wf is connected to a high-voltage battery Bh of 100V or higher via a power drive unit Pf and a three-phase wire L1. The main rear motor Mm for driving the rear wheels Wr, Wr is connected to the high-voltage battery Bh via a power drive unit Pr and a three-phase wire L2. In addition, the sub rear motor Ms for driving the rear wheels Wr, Wr is connected to a low-voltage battery B1 whose voltage is lower than that of the high-voltage battery Bh via a direct-current wire L3, and the low-voltage battery Bl is connected to a generator G driven by the engine E via a direct-current wire L4.

Next, the construction of the speed reduction gear set R for transmitting the driving forces of the main rear motor Mm and the sub rear motor Ms to the rear wheels Wr, Wr will be described below based on FIG. 2.

A first gear 13 is fixed to a first shaft 12 which is connected to an output shaft 11 of the sub rear motor Ms via an electromagnetic clutch C2, and this first gear 13 meshes with a second gear 15 fixed to a second shaft 14 which constitutes an output shaft of the main rear motor Mm. A third gear 16 fixed to the second shaft 14 meshes with a fourth gear 18 supported relatively rotatably on a third shaft 17, and a fifth gear 19 fixed to the third shaft 17 meshes with a final driven gear 21 of a differential 20. The fourth gear 18 can be connected to the third shaft 17 via a synchromesh clutch C1.

FIG. 3 shows a control system for the front motor M for driving the front wheels Wf, Wf and the main rear motor Mm and the sub rear motor Ms for driving the rear wheels Wr, Wr. A managing ECU 26 into which signals are inputted which indicate wheel speed, engine rotational speed, accelerator pedal opening, forward and rearward accelerations, shift position, brake fluid pressure and brake switch communicates with a front motor ECU 27 so as to control the operation of the front motor M via the power drive unit Pf, communicates with a main rear motor ECU 28 so as to control the operation of the main rear motor Mm via the power drive unit Pr, communicates with a sub rear motor ECU 29 so as to control the operation of the sub rear motor Ms via the generator G, and furthermore communicates with a fuel injection ECU 30 and a battery ECU 31.

Next, the function of the first embodiment that is constructed as has been described heretofore will be described.

As shown in FIG. 1, the front motor M made up of the three-phase alternating-current motor is driven by converting a direct current of the high-voltage battery Bh to a three-phase alternating current at the power drive unit Pf, and similarly, the main rear motor Mm made up of the three-phase alternating-current motor is driven by converting the direct-current of the high-voltage battery Bh to a three-phase alternating-current at the power drive unit Pr. When the vehicle is decelerated, the front motor M and the main rear motor Mm are driven by driving force from the front wheels Wf, Wf and the rear wheels Wr, Wr so that the front motor M and the main rear motor Mm are made to function as a generator, whereby the high-voltage battery Bh is charged by generated output of the motor M functioning as the generator. In addition, the sub rear motor Ms made up of the direct-current brush motor is driven by direct current from the low-voltage battery Bl which is charged by generated output of the generator G driven by the engine E.

As this occurs, the driving torque of the front motor M is controlled so as to become a target value by the front motor ECU 27 and the power drive unit Pf, and the driving force of the main rear motor Mm is controlled so as to become a target value by the main rear motor ECU 28 and the power drive unit Pr. In addition, the driving torque of the sub rear motor Ms is controlled so as to become a target value by the sub rear motor ECU 29.

As shown in FIG. 2, when the synchromesh clutch C1 and the electromagnetic clutch C2 are engaged, the driving force of the sub rear motor Ms is transmitted to the left and right rear wheels Wr, Wr along a path extending from the electromagnetic clutch C2 -> the first shaft 12 -> the first gear 13 -> the second gear 15 -> the second shaft 14 -> the third gear 16 -> the fourth gear 18 -> the synchromesh clutch C1 -> the third shaft 17 -> the fifth gear 19 -> the final driven gear 21 -> the differential 20. On the other hand, the driving force of the main rear motor Mm is transmitted to the left and right rear wheels Wr, Wr along a path extending from the second shaft 14 -> the third gear 16 -> the fourth gear 18 -> the synchromesh clutch C1 -> the third shaft 17 -> the fifth gear 19 -> the final driven gear 21 -> the differential 20.

As is clear from FIGS. 4 and 5, the maximum rotational speed of the main rear motor Mm is N1, which can deal with vehicle speeds up to a vehicle speed V1, and the maximum rotational speed of the sub rear motor Ms is N2, which can deal with vehicle speeds up to a vehicle speed V2. The main rear motor Mm output a torque T1 which is the maximum driving force thereof in a vehicle speed range of 0 to V3, and the driving torque gradually decreases from V3 towards a vehicle speed V2. In addition, the sub rear motor Ms outputs a torque T4 which is the maximum driving torque thereof in a vehicle speed range from 0 to V4, and the driving torque gradually decreases from V4 towards the vehicle speed V2. A solid line in FIG. 4 indicates total values resulting from addition of the driving torque of the main rear motor Mm and the driving torque of the sub rear motor Ms and satisfies conditions for vehicle speed and driving torque which are required for hauling, as well as conditions for vehicle speed and driving torque which are required for driving on a sandy ground.

TABLE 1

|  | Vehicle Speed | S/MOT | M/MOT | Driving Force Transmission | C1 | C2 | Remarks |
|---|---|---|---|---|---|---|---|
| When stopped IG OFF |  | X | X | X | X | X |  |
| When stopped IG ON |  | X | X | X | ○ | X |  |
| When started forward (with low torque) |  | X | CW | ○ | ○ | X |  |
| When started forward (with high torque) |  | CCW | CW | ○ | ○ | ○ | hauling, driving on sandy ground |
| When started reverse (with low torque) |  | X | CCW | ○ | ○ | X |  |
| When started reverse (with high torque) |  | CW | CCW | ○ | ○ | ○ | hauling, driving on sandy ground |
| PR assist | Low, middle speed | X | CW | ○ | ○ | X | 40 km/h or lower |
|  | Low, middle speed | CCW | CW | ○ | ○ | ○ | 40 km/h or lower |
|  | High speed | X | X | X | X | X | 90 km/h or higher |
| Generative Braking | Low, middle speed | X | CW | ○ | ○ | X | 40 km/h or lower |
|  | High speed | X | X | X | X | X | 90 km/h or higher |

The operating conditions of the main rear motor Mm, the sub rear motor Ms, the synchromesh clutch C1 and the electromagnetic clutch C2 in various driving conditions are shown in Table 1. Note that in Table 1 a symbol CW denotes a clockwise rotation and a symbol CCW denotes a counterclockwise rotation.

When the vehicle is stopped with the ignition switch being switched off, both the synchromesh clutch C1 and the electromagnetic clutch C2 are disengaged, and the main rear motor Mm and the sub rear motor Ms are both stopped, whereby the transmission of driving force to the rear wheels Wr, Wr is stopped. When the vehicle is stopped with the ignition switch remaining switched on, the synchromesh clutch C1 is engaged, whereas the electromagnetic clutch C2 is disengaged, and both the main rear motor Mm and the sub rear motor Ms are stopped, whereby the transmission of driving force to the rear wheels Wr, Wr is stopped. The reason why the synchromesh clutch C1 is caused to remain engaged is because the vehicle can start from the stopped condition without any delay.

When the vehicle is started to move forward with a low torque, only the synchromesh clutch C1 is engaged, and only the main rear motor Mm is driven, whereby the driving force thereof is transmitted to the rear wheels Wr, Wr. When the vehicle is started to move forward with a high torque or when the vehicle hauls a trailer or the like or runs on the sandy ground, both the synchromesh clutch C1 and the electromagnetic clutch C2 are engaged, and both the main rear motor Mm and the sub rear motor Ms are driven, whereby the driving forces thereof are transmitted to the rear wheels Wr, Wr.

When the vehicle is started to reverse with a low torque, only the synchromesh clutch C1 is engaged, and only the main rear motor Mm is driven, whereby the driving force thereof is transmitted to the rear wheels Wr, Wr. When the vehicle is started to reverse with a high torque or when the vehicle hauls a trailer or the like or runs on the sandy ground, both the synchromesh clutch C1 and the electromagnetic clutch C2 are engaged, and both the main rear motor Mm and the sub rear motor Ms are driven, whereby the driving forces thereof are transmitted to the rear wheels Wr, Wr. However, the rotational directions of the main rear motor Mm and the sub rear motor Ms become opposite to the rotational directions thereof when the vehicle is started to move forward.

There are two modes available when assisting in driving the rear wheels Wr, Wr in low and middle vehicle speeds (lower than the vehicle speed V2). A first mode is identical to the case where the vehicle is started to move forward with a low torque, and only the synchromesh clutch C1 is engaged, and only the main rear motor Mm is driven, whereby the driving force thereof is transmitted to the rear wheels Wr, Wr. A second mode is identical to the case where the vehicle is started to move forward with a high torque, and both the synchromesh clutch C1 and the electromagnetic clutch C2 are engaged, and both the main rear motor Mm and the sub rear motor Ms are driven, whereby the driving forces thereof are transmitted to the rear wheels Wr, Wr. Note that from a viewpoint of protecting the sub rear motor Ms, in the second mode, the disengagement of the electromagnetic clutch C2 is implemented according to a predetermined rotational speed (N2 in FIG. 5) which is determined based upon the performance thereof.

In the case of a high vehicle speed (the vehicle speed V1 or higher), in addition to the disengagement of the electromagnetic clutch C2, which has been carried out before, the synchromech clutch C1 is also disengaged, so that the transmission of driving force to the rear wheels Wr, Wr is stopped. The reason for this is, as with the sub rear motor Ms, because the main rear motor Mm should be prevented from rotating at a speed exceeding a predetermined rotational speed (N1 in FIG. 5) that is determined based upon the performance thereof with a view to protecting the same motor.

During regenerative braking in low and middle vehicle speeds (lower than the vehicle speed V2) only the synchromesh clutch C1 is engaged, and only the main rear motor Mm is braked in a regenerative fashion, whereby the kinetic energy of the vehicle body is reclaimed and stored in the high-voltage battery Bh as electric energy. In the case of a high vehicle speed (the vehicle speed V1 or higher), both the synchromesh clutch C1 and the electromagnetic clutch C1 are disengaged, and both the main rear motor Mm and the sub rear motor Ms are stopped, whereby the regenerative braking by the main rear motor Mm is not implemented. The reason for this is, similar to the aforesaid case where the driving force is transmitted, due to the viewpoint of protecting the main rear motor Mm and the sub rear motor Ms.

Conditions for driving the sub rear motor Ms are as below. Driving forces that are to be distributed to the front wheels Wf, Wf and the rear wheels Wr, Wr are calculated by the managing ECU 26 based upon wheel speed, accelerator pedal opening, and forward and rearward accelerations. Then, in case the driving forces allocated to the rear wheels Wr, Wr cannot be supplied only by the main rear motor Mm, the sub rear motor Ms is driven so as to compensate for the shortage of driving force.

In addition, conditions for stopping the sub rear motor Ms that is so driven are described below under ① to ④.

① Although the rear wheels Wr, Wr, which are the sub driving wheels, are driven to prevent the slippage of the front wheels Wf, Wf, which are the main driving wheels, when the front wheels Wf, Wf start to slip, the sub rear motor Ms is stopped when the differential rotation between the front and rear wheels Wf, Wf; Wr, Wr reaches or lowers below a set value after the slippage of the front wheels Wf, Wf has been resolved.

② The sub rear motor Ms is stopped when the vehicle speed reaches or exceeds a set value (the vehicle speed V2 in the embodiment), and hence the rotational speed thereof exceeds an upper limit rotational speed (N2 in the embodiment) set therefor.

③ The sub rear motor Ms is stopped when the need for drastically accelerating the vehicle is obviated due to the accelerator opening and the rate of change thereof reaching or lowering below set values.

④ The sub rear motor Ms is stopped when the need for driving the rear wheels Wr, Wr is obviated due to the required driving force of the vehicle being able to be supplied only by the front wheels Wf, Wf.

Thus, since the motors for driving the rear wheels Wr, wr are divided into the main rear motor Mm having a large output and the sub rear motor Ms having a small output, so that both the main rear motor Mm and the sub rear motor Ms are driven when a large driving force is required as when the vehicle is driven at low speed to haul a trailer or the like or to run on the sandy ground, when compared with a case where a single large rear motor is used whose capacity equalizes the total of the capacities of the main rear motor Mm and the sub rear motor Ms, the maximum dimensions of the main rear motor Mm and the sub rear motor Ms can be made smaller than the maximum dimensions of the single large rear motor, respectively. As a result, the minimum ground clearance of the vehicle can be reduced, the intersecting angle with the drive shafts can be decreased, and the floor level of the vehicle can be lowered, while enhancing the running through performance at low vehicle speed.

In addition, since the sub rear motor Ms is disposed on an upstream side of the speed reduction gear set R, whereas the main rear motor Mm is disposed on a downstream side thereof, a sufficient reduced gear ratio from the sub rear motor Ms to the rear wheels Wr, Wr can be secured to thereby increase the rate of amplifying the torque, thereby making it possible to use a motor having a small output for the sub rear motor Ms. Moreover, since the sub rear motor Ms performs no regenerative braking, an inexpensive direct-current brush motor can be adopted for the sub rear motor Ms. In addition, the sub rear motor Ms is prevented from being drawn by the driving force of the main rear motor Mm by disengaging the electromagnetic clutch C2 when the sub rear motor Ms is not driven, thereby making it possible to suppress the wasteful consumption of power.

Additionally, since the sub rear motor Ms is connected to the low-voltage battery Bl, which is separate from the high-voltage battery Bh, it is possible not only to reduce the capacity of the high-voltage battery Bh which consumes more power due to being connected to the main rear motor Mm having a large output but also to miniaturize the front motor M which is driven by the engine E and functions as the generator for charging the high-voltage battery Bh. Moreover, the sub rear motor Ms made up of the direct-current brush motor needs no power drive unit, and this contributes to the reduction in cost and space.

Figure 6:
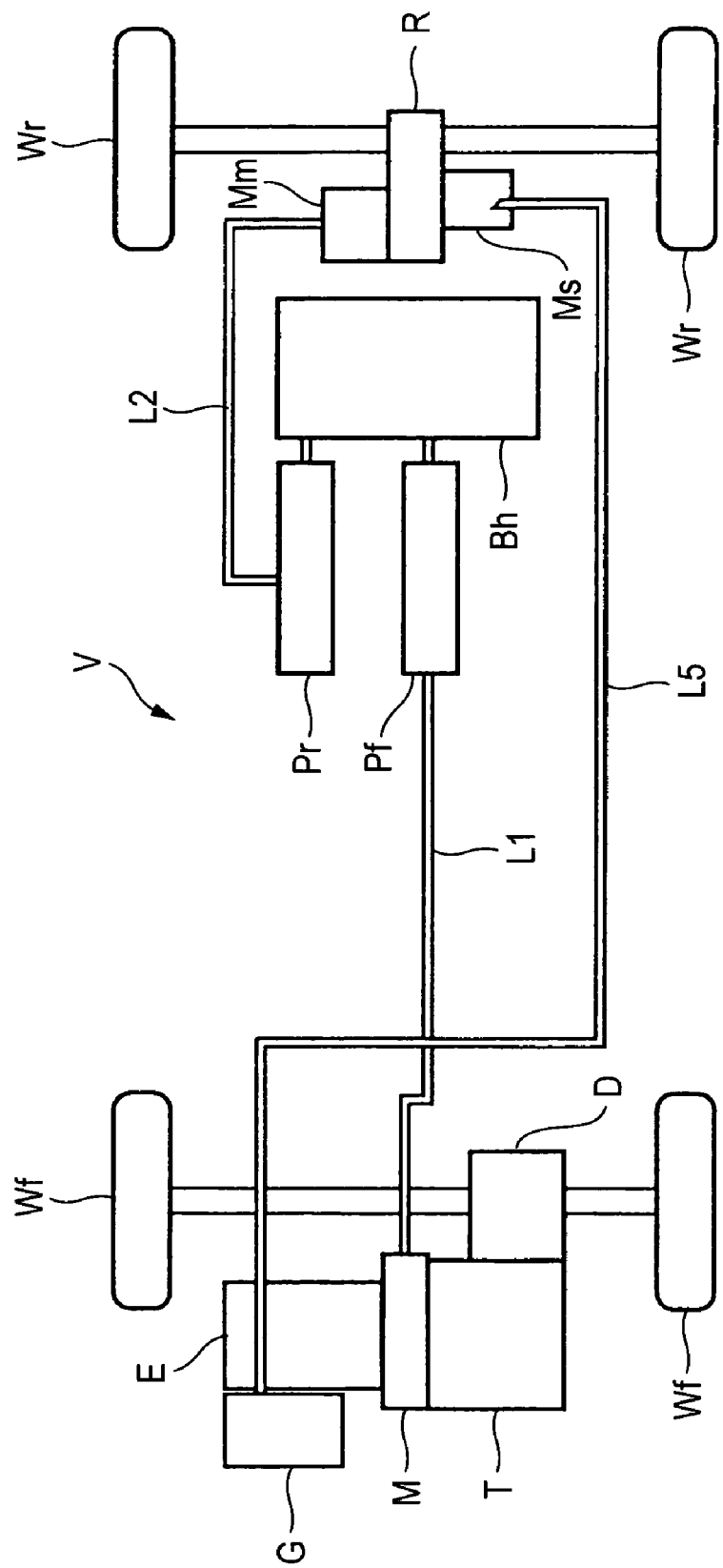
FIG. 6 is a diagram showing an overall configuration of a hybrid vehicle according to a second embodiment.

Next, a second embodiment of the invention will be described by reference to FIG. 6.

In the first embodiment illustrated in FIG. 1, while the low-voltage battery B1 is interposed between the generator G driven by the engine E and the sub rear motor Ms, in the second embodiment, with the low-voltage battery Bl being removed, the generator G and the sub rear motor Ms is direct connected to each other via a direct-current wire L5. Consequently, the control of the driving torque of the sub rear motor Ms is implemented by controlling the generate output of the generator G driven by the engine E. According to this embodiment, the cost and space can be saved by removal of the low-voltage battery Bl.

Figure 7:
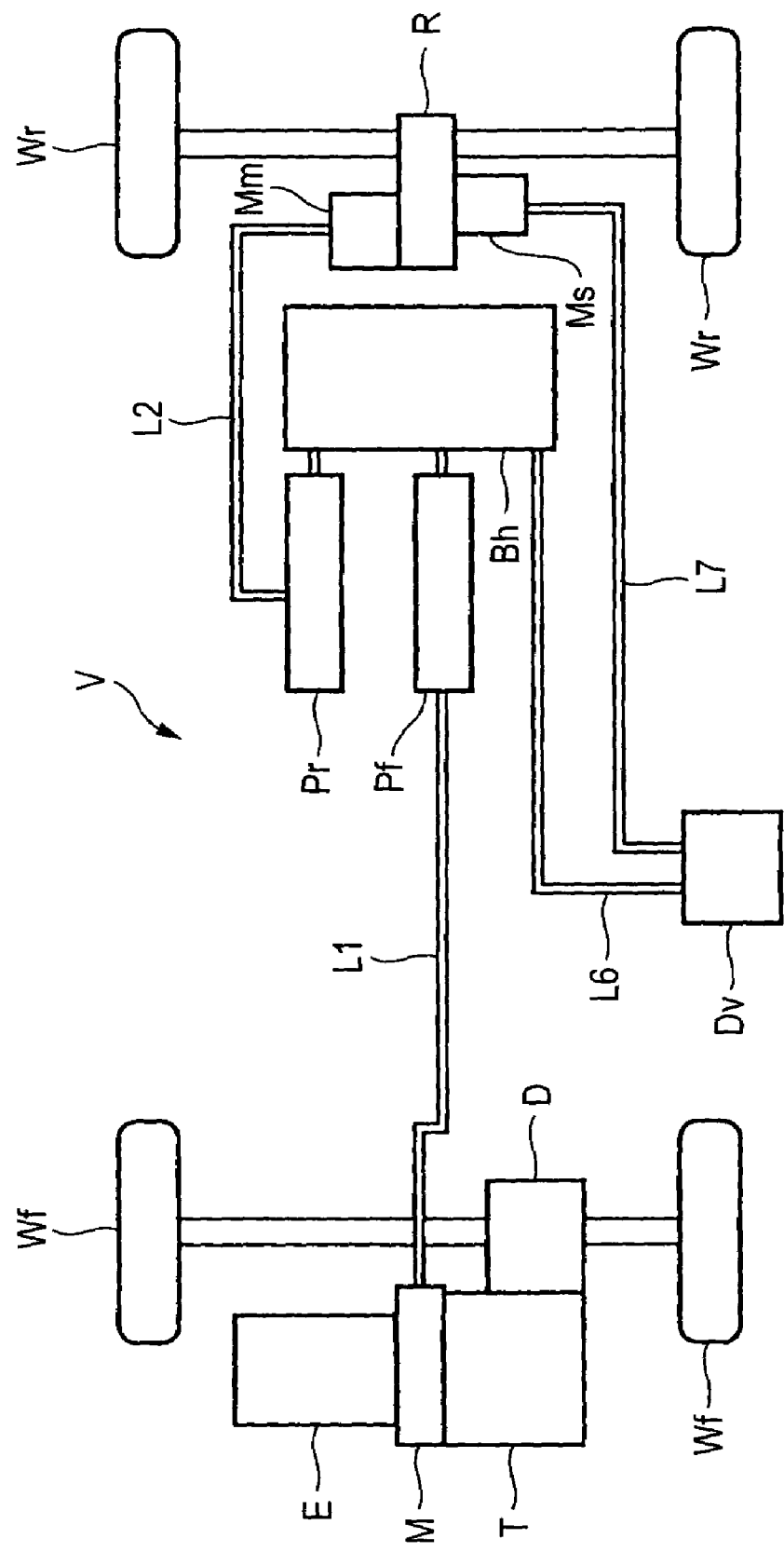
FIG. 7 is a diagram showing an overall configuration of a hybrid vehicle according to a third embodiment.

Next, a third embodiment will be described by reference to FIG. 7.

In the first and second embodiments illustrated in FIGS. 1 to 6, while the power used to drive the sub rear motor Ms is supplied from the generated output of the generator G driven by the engine E, in the third embodiment, the generator G and the low-voltage battery B1 are removed, and instead, the high-voltage battery Bh and the sub rear motor Ms is connected to each other via a direct-current wire L6, a downverter 32, and a direct-current wire L7. The sub rear motor Ms is driven by lowering the voltage of the high-voltage battery Bh by the downverter 32. According to this embodiment, the cost and space can be saved by removal of the low-voltage battery B1 and the generator G.

Figure 8:
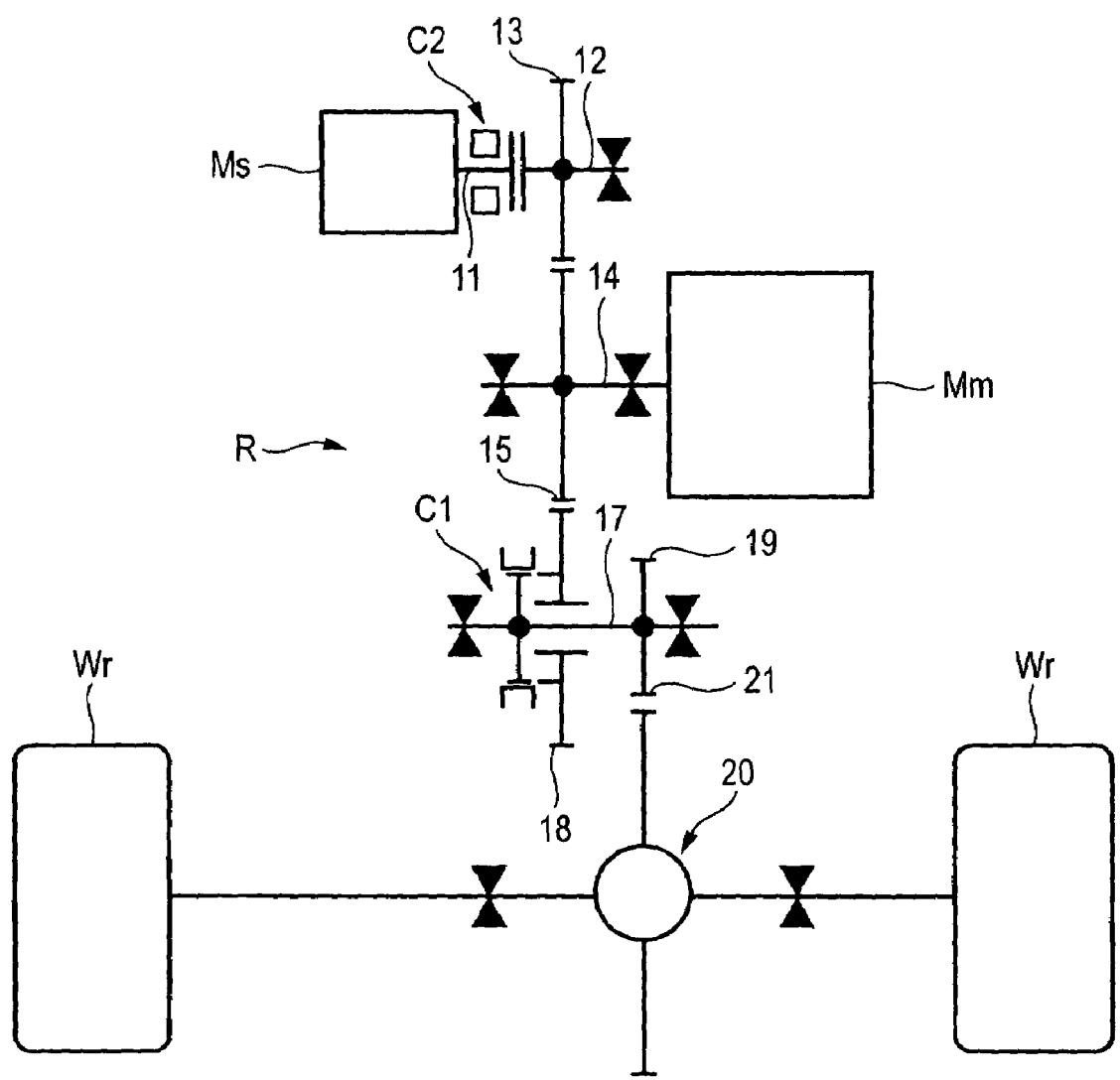
FIG. 8 is a diagram showing the construction of a driving system for rear wheels according to a fourth embodiment.

Next, a fourth embodiment will be described by reference to FIG. 8.

As is clear when comparing with the first embodiment illustrated in FIG. 2, in the fourth embodiment, the third gear 16 in the first embodiment is removed, and the second gear 15 is made to mesh directly with the fourth gear 18, whereby while the reduced gear ratio becomes slightly smaller, the number of components involved can be reduced so as to simplify the construction of the speed reduction gear set R.

Thus, while the embodiments of the invention have been described heretofore, the invention may be modified variously with respect to the design thereof without departing from the sprit and scope thereof.

For example, while the main rear motor Mm and the sub rear motor Ms are provided as the motors for driving the rear wheels Wr, Wr in the embodiments, three or more motors may be provided in the second and third aspects of the invention.

In addition, while the front motor M is provided on the front wheels Wf, Wf side in the embodiments, the front motor M may be removed.

Furthermore, the clutch according to the invention is not limited to the electromagnetic clutch C2 in the embodiments, and a hydraulic clutch or a clutch of any other type may be used.

Moreover, the voltages of the high-voltage battery Bh and the low-voltage battery Bl are not limited to those used in the embodiments and can be varied appropriately.

According to the construction, since the motor for driving the sub driving wheels comprises the plurality of different motors, so that the constituent motor or all the motors can be used to drive the sub driving wheels according to a driving force required by the vehicle, when compared with a case where a single motor is provided which can supply the total of driving forces of the plurality of motors, the sizes of the individual motors can be made smaller. Due to this, the minimum ground clearance of the vehicle can be reduced, the intersecting angle with the drive shafts can be decreased, and the floor level of the vehicle can be lowered while enhancing the running through performance when the required driving force of the vehicle is large.

In addition, according to the second aspect of the invention, the running through performance can be enhanced sufficiently by driving the sub driving wheels by all the motors as when running while hauling the boat or the like or on the gravelly road at low speed where a large driving force is required.

According to the third aspect of the invention, since the sub motor having a small output is disposed on the upstream side of the main motor relative to the direction in which the driving force is transmitted to the sub driving wheels, when the sub motor is brought to a stop since the required driving force can be supplied only by the main motor, there is caused no risk that the sub motor, which is being so stopped, resides along the power transmission path of the main motor to interrupt the transmission of power therefrom.

According to the fourth aspect of the invention, since the clutch for interrupting the transmission of driving force is interposed between the sub motor and the main motor, when driving the main motor with the sub motor being brought to a stop, the sub motor is prevented from being drawn by the main motor to thereby prevent an increase in power consumption.

According to the fifth aspect of the invention, since the high-voltage battery for driving the main motor having a large output is charged with regenerative power of the main motor, whereas the low-voltage battery for driving the sub motor having a small output is charged by the generator driven by the engine, the low-voltage battery is caused to bear part of the power for driving the sub driving wheels, so that the capacity of the high-voltage battery consuming more power can be reduced. Moreover, since the sub motor is driven after generated output of the generator is once stored in the low-voltage battery, when compared with a case where the sub motor is direct driven by the generated output of the generator, the control of the generator can be simplified.

According to the sixth aspect of the invention, since the high-voltage battery for driving the main motor having a large output is charged with regenerative power of the main motor and the sub motor having a small output is driven by the generated output of the generator driven by the engine, the generated output of the generator is supplied for use for part of the power for driving the sub driving wheels, so that the capacity of the high-voltage battery consuming more power can be reduced. Moreover, no battery for storing the generated output of the generator is required, this contributing to the reduction in cost and space.

According to the seventh aspect of the invention, since the high-voltage battery for driving the main motor having a large output is charged with regenerative power of the main motor and the sub motor having a small output is driven by lowering the voltage of the battery by a downverter, neither a generator nor a battery exclusively used for driving the sub driving wheel is required, which can contribute to the reduction in cost and space.

According to the eights aspect of the invention, since the torque of the sub motor can be amplified by the speed reduction member, the sub motor can be made smaller in size, and moreover, the torque of the sub motor can be amplified further along a reduction path of the main motor.

According to the ninth aspect of the invention, by provision of the motor/generator which functions as a motor to assist the engine in providing driving force, in the event that a required driving force is not sufficiently supplied only by the engine for driving the main driving wheels and the motor for driving the sub driving wheels, the driving force of the motor/generator can assist in sufficing the required driving force. In addition, by provision of the motor/generator which functions as a generator to generate power, in the event that only the generative power generated by the motor using the driving force reversely transmitted from the sub driving wheels is insufficient for a requirement, the motor/generator can be made to function as the generator by the driving force of the engine or driving force reversely transmitted from the main driving wheels so as to increase the power generating capability of the vehicle.

What is claimed is:

1. A hybrid vehicle comprising:
    an engine for driving main driving wheels;
    a plurality of motors for driving sub driving wheels;
    a first speed reduction member disposed between a sub motor and a main motor;
    a second speed reduction member disposed between the main motor and the sub driving wheels;
    a first clutch connecting the sub motor and the main motor, the first clutch including the first speed reduction member; and
    a second clutch connecting the main motor and the sub driving wheels, the second clutch including the second speed reduction member,
    wherein only the second clutch is connecting the main motor and the sub driving wheels or the first clutch is connecting the sub motor and the main motor and the second clutch is connecting the main motor and the sub driving wheels.

2. A hybrid vehicle as set forth in claim 1, wherein the sub driving wheels are driven by all the motors at low vehicle speed where the driving force required by the vehicle is large.

3. A hybrid vehicle as set forth in claim 1, wherein the plurality of motors comprises the main motor having a large output and the sub motor having a small output, the sub motor being disposed on an upstream side of the main motor relative to a direction in which the driving force is transmitted to the sub driving wheels.

4. A hybrid vehicle as set forth in claim 3, wherein a clutch for interrupting the transmission of driving force is disposed between the sub motor and the main motor.

5. A hybrid vehicle as set forth in claim 1, wherein the plurality of motors comprises the main motor having a large output and the sub motor having a small output, and wherein a high-voltage battery for driving the main motor is charged with regenerative power of the main motor, whereas a low-voltage battery for driving the sub motor is charged by a generator driven by the engine.

6. A hybrid vehicle as set forth in claim 1, wherein the plurality of motors comprises the main motor having a large output and the sub motor having a small output, and wherein a battery for driving the main motor is charged with regenerative power of the main motor, and the sub motor is driven by generated output of a generator driven by the engine.

7. A hybrid vehicle as set forth in claim 1, wherein the plurality of motors comprises the main motor having a large output and the sub motor having a small output, and wherein a battery for driving the main motor is charged with regenerative power of the main motor, and the sub motor is driven by lowering the voltage of the battery by a downverter.

8. A hybrid vehicle as set forth in claim 1, wherein the first speed reduction member is disposed directly between the sub motor and the main motor.

9. A hybrid vehicle as set forth in claim 1, further comprising a motor/generator which functions both as a motor to assist the engine for driving the main driving wheels in providing driving force and as a generator to generate power by being driven by driving force of the engine or driving force which is reversely transmitted from the main driving wheels.

10. A hybrid vehicle as set forth in claim 1, wherein the first speed reduction member comprises a first gear operationally connected to the sub motor and the second speed reduction member comprises a second gear operationally connected to the main motor.

11. A hybrid vehicle as set forth in claim 10, wherein the first gear is operationally connected to the sub motor via an electromagnetic clutch.

12. A hybrid vehicle as set forth in claim 10, wherein the second gear is operationally connected to a differential via a synchromesh clutch.

* * * * *